(12) United States Patent
Berfield

(10) Patent No.: US 6,478,342 B1
(45) Date of Patent: Nov. 12, 2002

(54) SWIVEL COUPLING FOR A HOSE

(75) Inventor: Robert C. Berfield, Jersey Shore, PA (US)

(73) Assignee: Shop Vac Corporation, Williamsport, PA (US)

( * ) Notice: Subject to any disclaimer, the term of this patent is extended or adjusted under 35 U.S.C. 154(b) by 0 days.

(21) Appl. No.: 09/416,830

(22) Filed: Oct. 12, 1999

(51) Int. Cl.[7] ............................................... F16L 27/00
(52) U.S. Cl. ........................ 285/276; 285/7; 285/275; 285/305; 285/319; 285/321; 285/903
(58) Field of Search .......................... 285/276, 7, 275, 285/321, 305, 319, 903

(56) References Cited

U.S. PATENT DOCUMENTS

| 2,260,263 A | | 10/1941 | Röber ........................ 131/105 |
|---|---|---|---|
| 2,296,234 A | | 9/1942 | Frantz ........................ 285/167 |
| 2,305,524 A | | 12/1942 | Frazer-Nash .............. 285/97.9 |
| 2,367,188 A | | 1/1945 | Anderson ................... 285/168 |
| 2,516,883 A | | 8/1950 | Kelly .......................... 285/174 |
| 3,017,654 A | * | 1/1962 | Allenby et al. ............ 15/327.7 |
| 3,245,698 A | | 4/1966 | Fromknecht ................ 285/7 |
| 3,565,464 A | * | 2/1971 | Wolf ............................ 285/7 |
| 3,864,784 A | | 2/1975 | Kilstrom et al. ............. 15/380 |
| 4,099,744 A | | 7/1978 | Kutnyak et al. ............. 285/7 |
| 4,345,805 A | | 8/1982 | Finley et al. ................ 339/16 |
| 4,542,922 A | * | 9/1985 | Grossauer ................... 285/320 |
| 4,558,889 A | | 12/1985 | Gans ............................ 285/7 |
| 4,618,195 A | | 10/1986 | Keane ......................... 339/16 |
| 4,625,998 A | | 12/1986 | Draudt et al. ................ 285/7 |
| 4,669,755 A | | 6/1987 | Harris et al. ................. 285/7 |
| 4,723,796 A | | 2/1988 | Nattel ......................... 285/161 |
| 4,747,621 A | * | 5/1988 | Gans et al. .................. 285/7 |
| 4,758,023 A | | 7/1988 | Vermillion .................. 285/7 |
| 4,775,173 A | | 10/1988 | Sauer .......................... 285/174 |
| 4,817,991 A | | 4/1989 | Frentzel et al. .............. 285/7 |
| 4,904,000 A | * | 2/1990 | Matsui ........................ 285/305 |
| 4,919,462 A | | 4/1990 | Matsui et al. ............... 285/175 |
| 4,964,189 A | | 10/1990 | Rau et al. ................... 15/327.2 |
| RE34,325 E | | 7/1993 | Rau et al. ................... 15/327.2 |
| 6,254,145 B1 | * | 7/2001 | Schwarz et al. ............ 285/319 |

FOREIGN PATENT DOCUMENTS

| GB | 2107814 A | * | 9/1982 | ................. 285/321 |
|---|---|---|---|---|
| GB | 2241547 A | * | 2/1991 | ................. 285/321 |
| GB | 2 350 656 A | | 12/2000 | |

OTHER PUBLICATIONS

European Search Report—Application No. EP 00 40181.

* cited by examiner

Primary Examiner—J. J. Swann
Assistant Examiner—Carlos Lugo
(74) Attorney, Agent, or Firm—Marshall, Gerstein & Borun

(57) ABSTRACT

A swivel coupling for attachment to a hose. The swivel coupling comprises a sleeve defining an aperture sized to received a retainer clip. The hose is formed with convolutions so that the retainer clip may be attached to the hose. When the hose is inserted into the sleeve, the retainer clip may be inserted into the aperture to secure the hose against axial movement yet the allow the hose to swivel.

21 Claims, 4 Drawing Sheets

SWIVEL COUPLING FOR A HOSE

FIELD OF THE INVENTION

The present invention generally relates to hose couplings, and more particularly to couplings which allow the hose to swivel.

BACKGROUND OF THE INVENTION

Couplings are used to releaseably attach hoses to various types of apparatus. In a wet/dry vacuum cleaner, for example, a coupling is typically used to connect the hose to a vacuum tank or canister. A second coupling may be used to attach the remaining end of the hose to an accessory such as a vacuum attachment. The engagement of the coupling and the hose is preferably releaseable so that the hose may be quickly attached to and removed from the vacuum tank, and so that various vacuum attachments may be used as needed. In addition, it is advantageous for the couplings to allow the hose to swivel, so that the vacuum attachment may be positioned as need and the hose does not kink during use.

U.S. Pat. No. 4,747,621 discloses an aquatic vacuum hose swivel cuff 104 adapted for attachment to a corrugated blow-molded hose 102. The hose is formed with indentations 110 between convolutions 112. The cuff 104 has an annular ring 116 adapted to engage an indentation 10. To insert an end of the hose 102 into the cuff 104, the hose 102 must be collapsed, such as by pinching the hose, to pass through the annular ring 116. As a result, the cuff 104 is overly difficult and cumbersome to use. In addition, removal of the hose 102 from the cuff 104 appears overly difficult, if not impossible, since the hose end again must be pinched to clear the annular ring 116 but the cuff 104 does not appear to allow access to the hose 102.

U.S. Pat. No. 4,625,998 discloses a swivel hose coupling 1 for attachment to a flexible hose 2. The swivel hose coupling 1 includes a swivel insert 3 for attachment to the hose, and a swivel hose end piece 4 which is rotatably connected to the hose end by the swivel insert. The swivel insert 3 is molded in the form of a sleeve 6 with an internal thread 7. The hose 2 has an external spiral thread 5 which is complementary to the internal thread 7 of the swivel insert 3 so that the swivel insert 3 may be screwed onto the end of the hose 2. To assemble the swivel hose coupling 1, the swivel hose end piece 4 must be heated to make it pliable so that the swivel insert 3 can be pushed into the end piece 4. As a result, the swivel hose coupling is overly complex and difficult to assemble, and uses a threaded connection, which may become unscrewed, to engage the hose and the coupling.

SUMMARY OF THE INVENTION

In accordance with certain aspects of the present invention, a swivel coupling is provided for attachment to a hose which extends along an axis and has a generally cylindrical outside surface formed with at least one convolution extending about the axis, the convolution having an axial width. The coupling comprises a sleeve having a seating portion sized to receive an end of the hose, the seating portion defining an aperture. A retainer clip has a base portion sized to closely fit inside the aperture, and a pair of inner engaging arms projecting from the base portion normal to the axis and axially spaced by a distance approximately equal to the axial width of the convolution. The retainer clip is removably insertable into the aperture so that the inner engaging arms engage the convolution to prevent the hose from moving in an axial direction, yet allow the hose to rotate about the axis of the hose.

In accordance with additional aspects of the present invention, a vacuum hose assembly is provided for attachment to a vacuum tank. The vacuum hose assembly comprises an accessory sleeve having a mounting portion adapted for attachment to a vacuum accessory and a seating portion, the seating portion defining a first aperture. A hose extends along an axis and has a generally cylindrical outside surface. A first end of the hose being sized for insertion into the seating portion of the accessory sleeve, and a second end adapted for fluid communication with the vacuum tank. The first end of the hose is formed with at least a first convolution extending normal to the axis, the first convolution having an axial width. A first retainer clip has a base portion sized to closely fit inside the aperture, and a pair of engaging arms projecting from the base portion normal to the axis and axially spaced by a distance equal to the axial convolution width. The retainer clip is removably insertable into the aperture so that the pair of engaging arms engage the first convolution to prevent the hose from moving in an axial direction, yet allow the hose to rotate about the axis of the hose.

In accordance with further aspects of the present invention, a method of securing a hose in a swivel coupling is provided, in which the hose extends along an axis and has a generally cylindrical outside surface formed with at least one convolution extending about the axis, the convolution having an axial width. The swivel coupling includes a sleeve with a seating portion sized to receive an end of the hose and defines an aperture. The swivel coupling also includes a retainer clip having a base portion sized to closely fit the aperture, and at least two engaging arms projecting from the base portion, the engaging arms being spaced by a distance equal to the axial width of the convolution. The method comprises the steps of inserting an end of the hose inside the seating portion of the sleeve until a portion of the at least one convolution is aligned with the aperture. The retainer clip is then inserted into the aperture with the at least two engaging arms engaging the at least one convolution of the hose until the base portion of the retainer clip is inside the aperture. As a result, the retainer clip prevents the hose from moving in an axial direction but allows the hose to swivel about the axis.

In accordance with still further aspects of the present invention, a method of removing a hose from a swivel coupling is provided, in which the hose extends along an axis and has a generally cylindrical outside surface formed with at least one convolution extending about the axis, the convolution having an axial width. The swivel coupling includes a sleeve with a seating portion sized to receive an end of the hose and defines an aperture. The swivel coupling also includes a retainer clip having a base portion sized to closely fit the aperture, and at least two engaging arms projecting from the base portion and spaced to engage opposite sides of the convolution. The method comprises the steps of depressing the base portion of the retainer clip and attached hose in a radially inward direction until the base portion is disposed inside the seating portion of the sleeve. The hose and attached retainer clip are then pulled out of the seating portion of the sleeve. The hose comprises a flexible material to allow sufficient deflection of the hose and retainer clip during the depressing step.

DETAILED DESCRIPTION OF THE PREFERRED EMBODIMENTS

Figure 1:
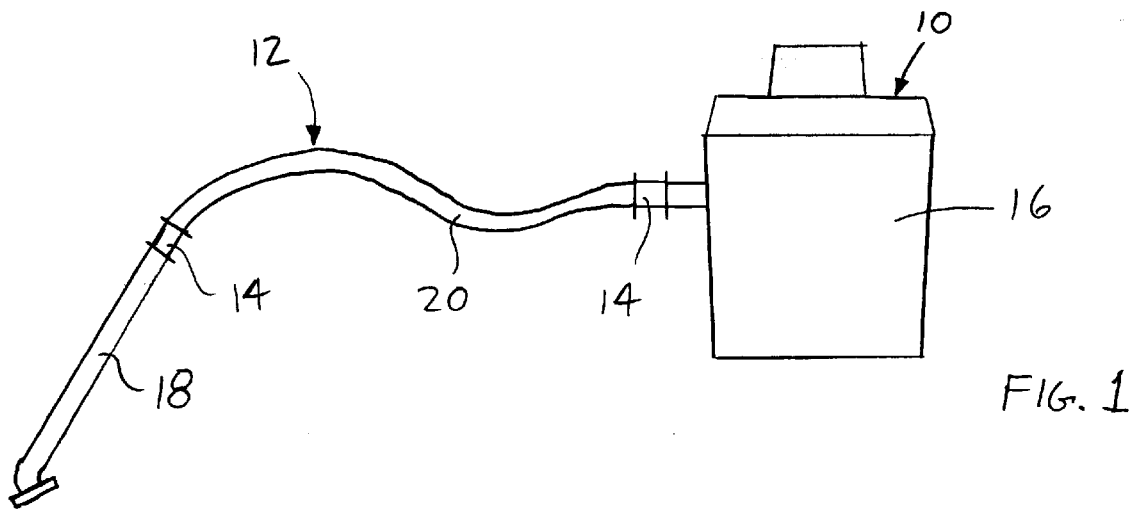
FIG. 1 is a perspective view of a vacuum cleaner having a vacuum hose assembly with swivel couplings in accordance with the teachings of the present invention.

Referring to the drawings, a vacuum cleaner 10 is shown having vacuum hose assembly 12 incorporating two swivel couplings 14 in accordance with the teachings of the present invention. One of the swivel couplings 14 attaches one end of a hose 20 to a vacuum tank 16 of the vacuum cleaner 10, while the other swivel coupling 14 attaches a second end of the hose 20 to a vacuum accessory 18, such as a directional wand. The couplings 14 allow the hose to swivel or rotate during use, thereby minimizing twisting forces and kinks in the hose 20. While for clarity of illustration, the swivel couplings 14 are shown herein for use with a specific vacuum hose assembly 12 attached to a particular vacuum cleaner 10, persons of ordinary skill in the art will readily appreciate that the teachings of the invention are in no way limited to use with that specific vacuum hose assembly 12 and vacuum cleaner 10, or to any other particular environment of use. On the contrary, swivel couplings 14 constructed in accordance with the teachings of the invention may be incorporated into any type of hose assembly used in any application which would benefit from the advantages they offer without departing from the scope and spirit of the invention.

Figure 2:
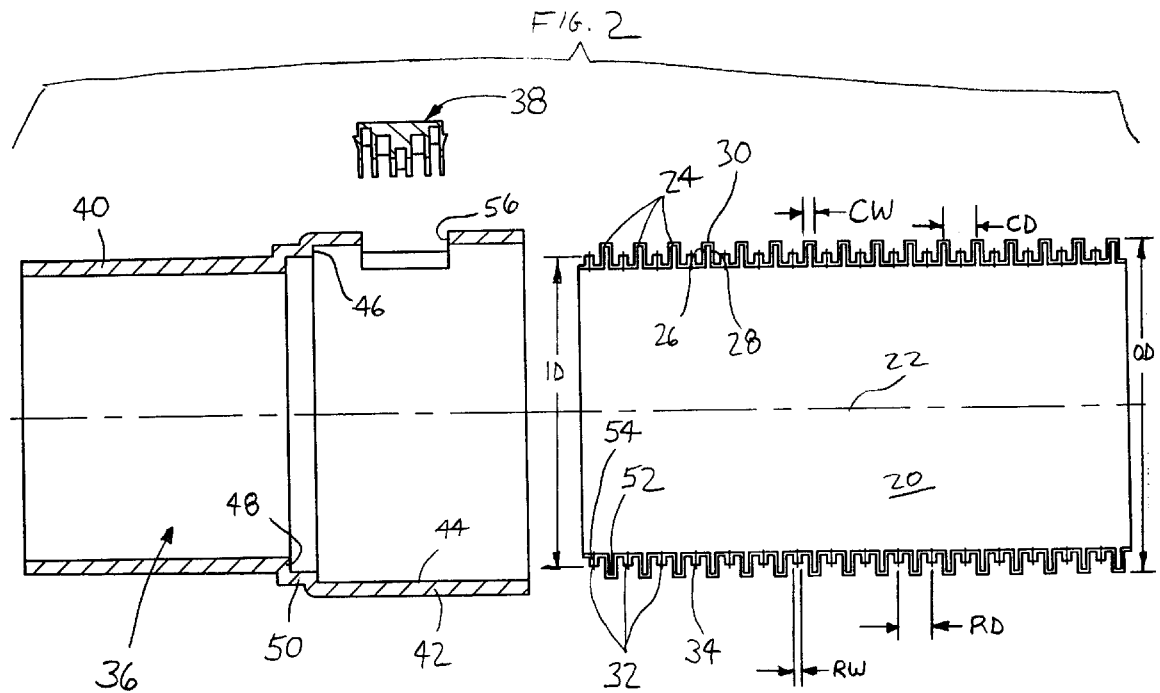
FIG. 2 is an exploded side elevation view, in cross-section, of a sleeve, a hose, and a retainer clip in accordance with the teachings of the present invention.

As best illustrated in FIG. 2, the hose 20 extends along an axis 22 and has a cylindrical outside surface formed with a plurality of convolutions, defined herein a plurality of projections which define gaps or crenels therebetween. According to the illustrated embodiment, the convolutions include a plurality of corrugations 24. Each corrugation 24 is generally U-shaped and comprises first and second flange portions 26, 28 connected by a cylindrical outer wall portion 30. Each of the outer wall portions 30 has a width CW in an axial direction parallel to the axis 22, the outer wall portions 30 defining an outer diameter OD of the hose 20. The corrugations 24 are spaced from one another in the axial direction by a distance CD. The hose may be formed of any suitable material exhibiting a sufficient moldability and flexibility, and is preferably formed of an ethyl vinyl acetate material. The corrugations 24 allow the hose 20 to bend more easily and across a wider range of motion without forming kinks or creases in the hose 20.

In the illustrated embodiment, the convolutions in the hose 20 also include a plurality of radially projecting annular ribs 32 interposed between the corrugations 24 to reduce noise levels generated by air flowing through the hose 20, as is generally known in the art. As best illustrated in FIG. 2, each rib 32 is formed about the axis 22 and has a solid, generally rectangular cross section. Each rib 32 has a cylindrical outer surface 34 defining an intermediate diameter ID which is less than the outer diameter OD defined by the corrugations 24. The outer surface 34 of each rib 32 has an axial width RW. Furthermore, the ribs 32 are spaced from one another in the axial direction by a distance RD substantially equal to the distance CD between corrugations 24. Accordingly, it will be appreciated that the outside surface of the hose 20 is formed with alternating corrugations 24 and ribs 32. While the hose 20 of the illustrated embodiment includes corrugations 24 and ribs 32, it will be appreciated that the hose 20 may be formed with only corrugations 24, ribs 32, or other type of convolution, or may be formed with several different types of convolutions, in accordance with the present invention.

The swivel coupling 14 comprises a sleeve 36 and a retainer clip 38, as illustrated in FIGS. 2–6. The sleeve 36 and retainer clip 38 are preferably formed of a material which is more rigid than the hose material, such as polystyrene or polypropylene. The sleeve 36 comprises a mounting portion 40 adapted for attachment to, for example, the vacuum tank 16 or a vacuum accessory 18, according to the location of the swivel coupling 14. The sleeve 36 also includes a seating portion 42 having an inside surface 44 sized to receive the hose 20. In the preferred embodiment, the inside surface 44 of the seating portion 42 is sized closely fit the outer diameter OD defined by the outer wall portions 30 of the corrugations 24. The seating portion 42 is formed with an outer shoulder 46 and inner shoulder 48 connected by an intermediate wall 50. The intermediate wall 50 has an inside diameter which is less than the outer diameter OD, so that the outer shoulder 46 engages a first corrugation 52 located nearest an end of the hose 20. The inner shoulder 48 connects the mounting portion 40 to the seating portion 42, and the mounting portion 40 has an inside diameter which is less than the intermediate diameter ID defined by the outer surface 34 of each rib 32. As a result, a first rib 54 located nearest the end of the hose 20 is prevented from passing through the inner shoulder 48.

Figure 8A:
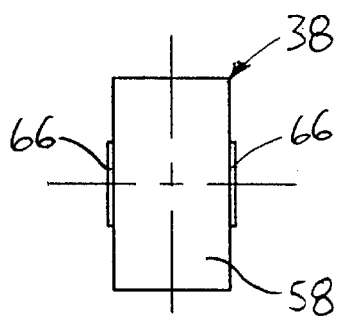
FIG. 8A is a top view of a retainer clip in accordance with the present invention.
Figure 8B:
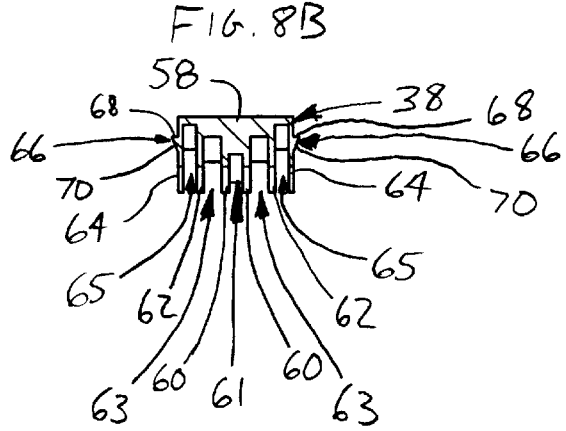
FIG. 8B is a side elevation view, in cross-section, of the retainer clip taken along line 8B—8B of FIG. 8A.

In accordance with certain aspects of the present invention, the seating portion 42 of the sleeve 36 defines an aperture 56. As illustrated in FIGS. 2 and 8b, the aperture 56 is positioned intermediate the outer shoulder 46 and a free end 60 of the seating portion 42. According to the embodiment illustrated at FIG. 4, the aperture 56 has a generally rectangular shape, when viewed from above, to provide access to at least one rib 32 and corrugation 24.

Figure 3:
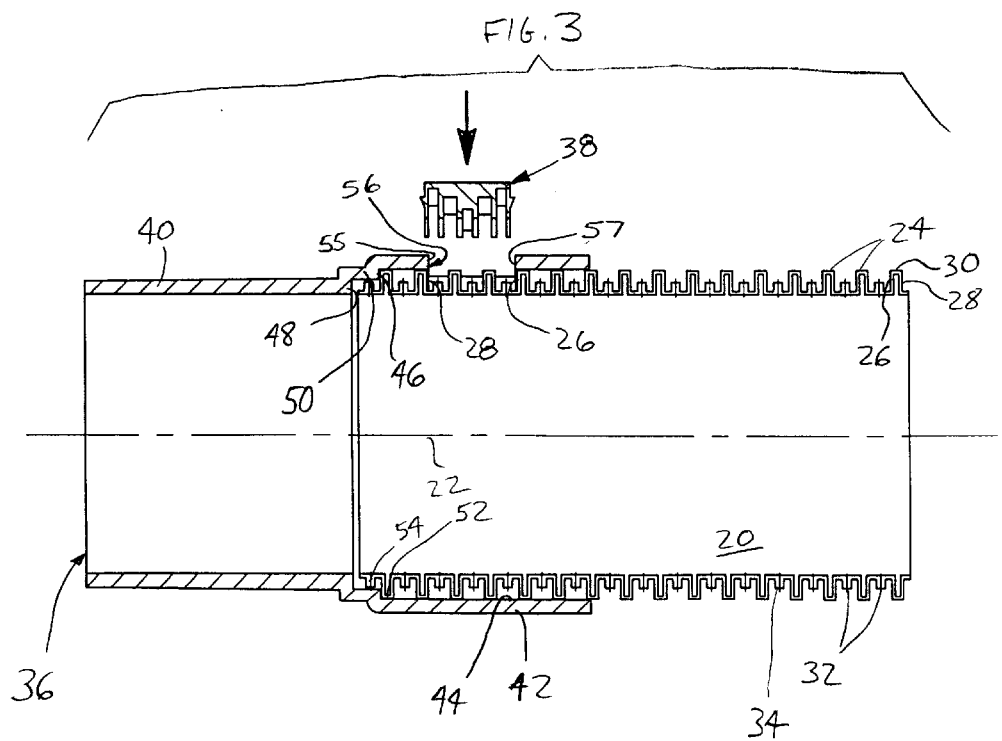
FIG. 3 is a side elevation view, in cross-section, showing a hose inserted in a sleeve before attachment of a clip in accordance with the present invention.

In the preferred embodiment, the aperture 56 is formed a specific distance from the outer shoulder 46, so that the convolutions in the hose 20 are properly aligned with the aperture 56 when the hose 20 is inserted in the sleeve 36. As best shown in FIG. 3, the distance between the outer shoulder 46 and a first edge 55 of the aperture 56 is such that when the hose 20 is inserted into the seating portion 42 of the sleeve 36 so that the first corrugation 52 engages the outer shoulder 46, the second flange portion 28 of a corrugation 24 is aligned with the first edge 55. In the illustrated embodiment, the distance between the outer shoulder 46 and first edge 55 is equal to a corrugation distance CD plus a corrugation width CW. In addition, the aperture 56 preferably has an axial dimension such that a second edge 57 of the aperture 56 is aligned with the first flange portion of another corrugation 24, as best shown in FIG. 3.

It will be appreciated that the hose 20 is typically provided with ends which terminate somewhere between adjacent corrugations 24. The intermediate wall 50, therefore, preferably has a length sufficient to accommodate a spare length of hose extending beyond the first corrugation 52, so that the first corrugation 52 may engage the outer shoulder 46. In the illustrated embodiment, the intermediate wall 50 has a length equal to slightly less than a corrugation distance CD. As a result, when the hose 20 is fully inserted into the seating portion 42, the hose 20 is not only aligned properly with the aperture 56, but also forms a seal with the outer shoulder 46.

Figure 8C:
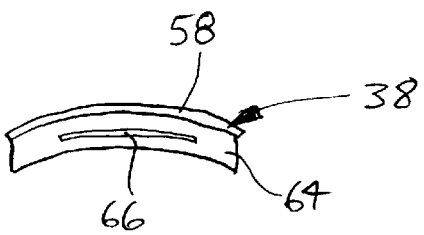
FIG. 8C is an end view of the retainer clip taken along lines 8C—8C of FIG. 8A.
Figure 5:
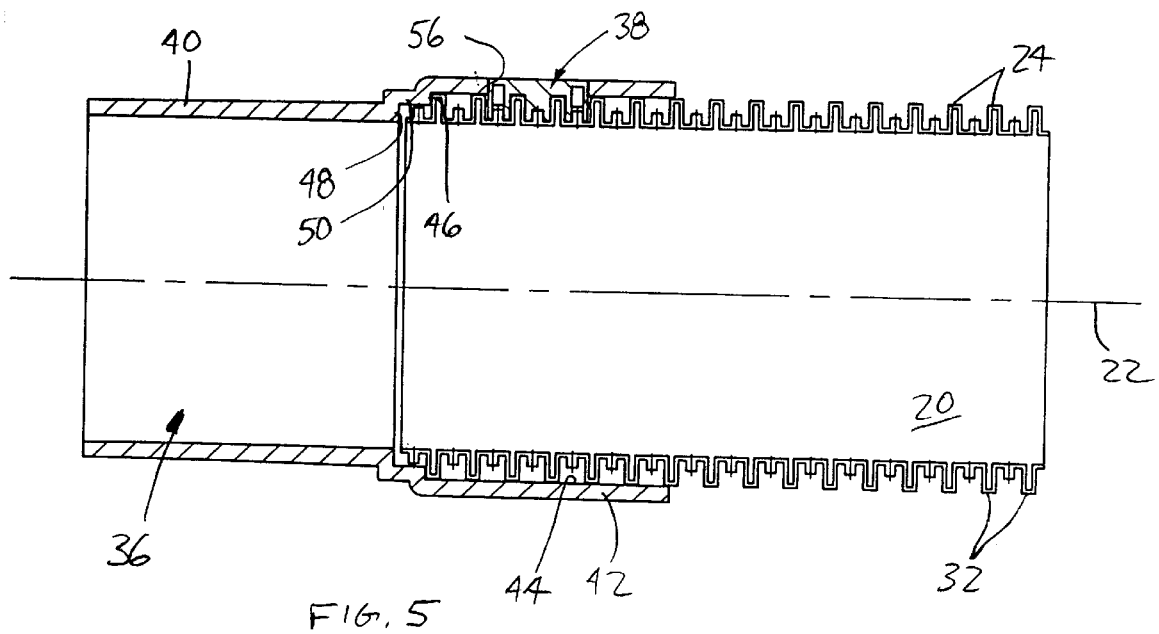
FIG. 5 is a side elevation view, in cross-section, of an assembled swivel coupling in accordance with the present invention.

The retainer clip 38 is sized for insertion into the aperture 56 and adapted to engage the hose 20 to secure the hose end inside the seating portion 42. As best illustrated in FIGS. 8A–8C, the retainer clip 38 has a base portion 58 having a generally rectangular space sized to closely fit the aperture 56. A pair of inner engaging arms 60 depends from the base portion 58 and define an inner recess 61 having an axial width sized to receive a rib 32. A pair of intermediate engaging arms 62 also depends from the base portion 58 on opposite sides of the inner engaging arms 60. Each intermediate engaging arm 62 is spaced from the adjacent inner engaging arm 60 by an axial distance to define intermediate recesses 63. Each intermediate recess 63 is sized to receive a corrugation 24 of the hose 20 located on opposite sides of the rib 32 to be engaged by the inner arms 60. A pair of outer engaging arms 64 depends from the base portion 58 on opposite sides of the intermediate engaging arms 62. Each outer engaging arm 64 is spaced from the adjacent intermediate engaging arm 62 by an axial distance to define outer recesses 65. Each outer recess 65 is sized to receive a rib 32 located adjacent the corrugations 24 to be engaged by the intermediate arms 62. The retainer clip 38, therefore, may be attached to the hose 20 with the engaging arms 60, 62, 64 projecting into troughs defined between the corrugations 24 and ribs 32, as shown in FIG. 5. In this position, the inner recess 61 engages a rib 32, the intermediate recesses 63 engage corrugations 24 disposed on opposite sides of the rib, and the outer recesses 65 engage ribs 32 disposed outside of the corrugations. It will therefore be appreciated that when the retainer clip 38 is inserted inside the aperture 56, the retainer clip 38 prevents axial movement of the hose 20. Furthermore, the recesses are aligned with the corrugations 24 and ribs 32 so that the hose 20 may swivel or rotate about the axis 22.

The retainer clip 38 is further adapted to preventing the retainer clip 38 from exiting the aperture 56 in a radial outward direction. In the illustrated embodiment, a pair of locking tabs 66 are provided have a substantially flat locking face 68 and a sloped guiding surface 70 to provide a generally triangular cross section (FIGS. 2 and 8B). The locking face 68 of each tab 66 extends axially so that, when the retainer clip. 38 is inserted into the aperture 56, each locking facing 68 extends beyond a margin of the aperture 56, as shown in FIG. 5. When the retainer clip 38 is inserted from an exterior of the sleeve 36, the guiding surfaces 70 allow the locking tabs 66 to slide through the aperture. While the retainer clip 38 is illustrated having two locking tabs 66, it will be appreciated that the a single locking tab 66 may be used to secure the retainer clip 38 in the aperture 56. In the alternative, the retainer clip 38 may be press fit into the aperture 56, positioned inside the aperture 56 and ultrasonically welded to the sleeve 36, or otherwise secured inside the aperture 56 in accordance with the present invention.

Figure 4:
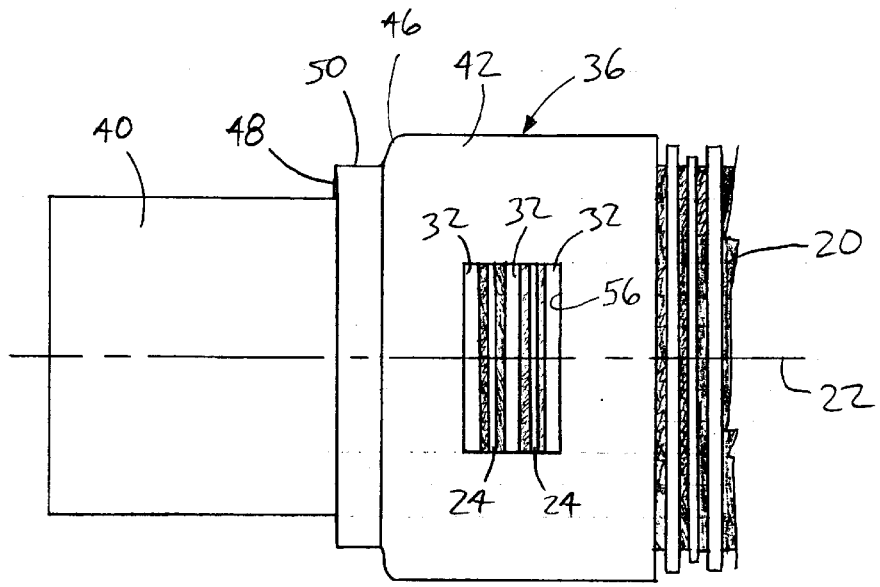
FIG. 4 is a top view of the hose inserted in the sleeve taken along line 4—4 of FIG. 3.

In accordance with additional aspects of the present invention, a quick and simple method for securing the hose 20 in a swivel coupling 14 is provided. First, an end of the hose 20 is inserted inside the seating portion 42 of the sleeve 36 so that the first flange portion 26 of the first corrugation 52 engages the outer shoulder 46 of the sleeve 36. With the hose 20 so positioned, a plurality of corrugations 24 and ribs 32 are properly aligned with and accessible through the aperture 56 (FIGS. 3 and 4). While the illustrated embodiment shows a plurality of corrugations 24 and ribs 32, it will be appreciated that the aperture 56 may be sized so that a single corrugation 24 or rib 32 is accessible, in accordance with the present invention. The retainer clip 38 is then inserted into the aperture 56 so that the engaging arms 60, 62, 64 are inserted into the troughs defined between the corrugations 24 and ribs 32, as illustrated in FIG. 5. The retainer clip 38 is inserted far enough into the aperture 56 so that the locking tabs 66 engage the seating portion 42 of the sleeve 36 outside of a margin of the aperture 56, thereby to prevent the retainer clip 38 from exiting the aperture 56 in a radially outward direction. With the retainer clip 38 in this position, the swivel coupling 14 holds the hose 20 in position, but allows the hose 20 to swivel about the hose axis 22.

Figure 6:
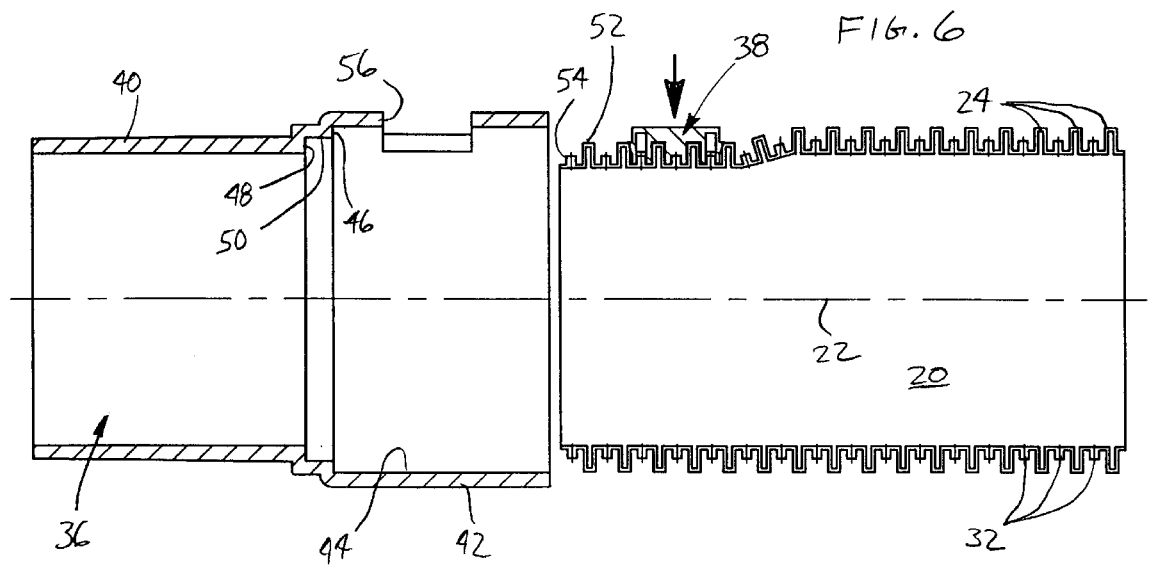
FIG. 6 is a side elevation view, in cross-section, of an alternative embodiment in which a clip is attached to a hose before insertion into a sleeve, in accordance with the present invention.

In an alternative method, the retainer clip 38 is first attached to hose 20 before the hose 20 is inserted into the sleeve 36, as illustrated in FIG. 6. The retainer clip 38 may be removably attached or permanently fixed to the hose 20. In this embodiment, the hose 20 must be formed of a flexible material so that the hose end having the attached retainer clip 38 may be depressed radially inwardly (FIG. 6). In this position, the hose end and attached retainer clip 38 are inserted into the seating portion 42 of the sleeve 36 until the retainer clip 38 is aligned with the aperture 56 (FIG. 7), at which time the hose end is returned to its original shape. With the hose end in its original shape, the retainer clip 38 is disposed inside the aperture 56 as shown in FIG. 5 to secure the hose 20 against axial movement while allowing the hose 20 to swivel.

Figure 7:
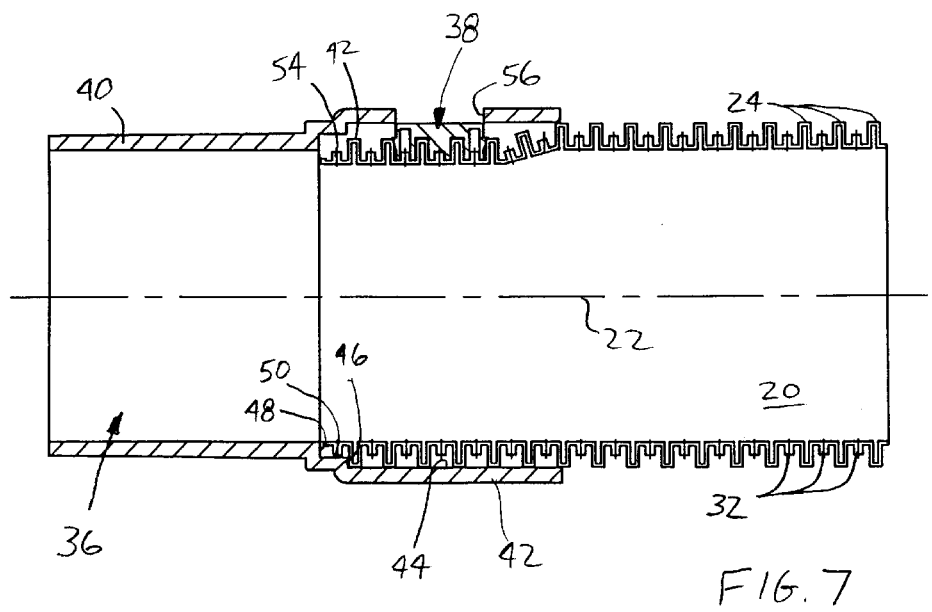
FIG. 7 is a side elevation view, in cross-section, of the alternative embodiment of FIG. 6 showing the hose inserted into the sleeve, in accordance with the present invention.

In accordance with additional aspects of the present invention, the hose 20 may be quickly and easily removed from the swivel coupling 14. As described above, when the hose 20 is attached to the swivel coupling 14, the end of the hose 20 is inserted inside the seating portion 42 of the sleeve 36 and the retainer clip 38 is inserted into the aperture 56 and engages the hose 20, as illustrated in FIG. 5. To remove the hose 20 from the coupling 14, the retainer clip 38 is removed from the aperture 56 and the hose may be withdrawn from the seating portion 42 of the sleeve 36. In the alternative, the retainer 38 and hose end may be depressed radially inwardly until the base portion 58 of the retainer clip 38 is entirely disposed inside the seating portion 42, as best illustrated in FIG. 7. The hose end and the attached retainer clip 38 may then slide through the seating portion 42 until the hose end is completely withdrawn from the sleeve 36 (FIG. 6). The retainer clip 38 may then be removed from the hose 20, if it is not permanently fixed thereto. As a result, the hose 20 may be quickly and easily removed and replaced in the event of kinks, cuts, or other damage to the hose 20.

In the light of the above, it will be appreciated that the present invention brings to the art a new and improved swivel coupling for attachment to a hose. The swivel coupling comprises a sleeve defining an aperture sized to received a retainer clip. The hose is formed with corrugations and ribs so that the retainer clip may be attached to the hose. When the hose is inserted into the sleeve, the retainer clip may be inserted into the aperture to secure the hose against axial movement yet the allow the hose to swivel. Accordingly, the swivel coupling of the present invention is easier to manufacture and assemble. Furthermore, a hose may be quickly and easily attached to and removed from the swivel coupling.

The forgoing detailed description has been given for clearness of understanding only, and no unnecessary limitations should be understood therefrom, as modifications would be obvious to those skilled in the art.

What is claimed is:

1. A swivel coupling for attachment to a hose extending along an axis and having a generally cylindrical outside surface formed with a plurality of convolutions extending about the axis and a pair of troughs positioned at opposite axial sides of the convolutions, each convolution having an axial width, the coupling comprising:

a sleeve having a seating portion sized to receive an end of the hose, the seating portion defining an aperture; and a retainer clip having a base portion sized to closely fit inside the aperture, a pair of inner engaging arms projecting from the base portion normal to the axis and axially spaced by a distance approximately equal to at least one axial width of a convolution, and a pair of outer engaging arms projecting from the base portion and located on opposite sides of the pair of inner engaging arms, each of the outer engaging arms being axially spaced from one of the inner engaging arms by a distance approximately equal to at least one axial width of a convolution;

wherein the retainer clip is removably insertable into the aperture so that the inner and outer engaging arms extend into the troughs on opposite axial sides of the convolutions to prevent the hose from moving in an axial direction, the inner and outer engaging arms being aligned with the troughs to allow the hose to rotate relative to the retainer clip about the axis of the hose.

2. The swivel coupling of claim 1, in which the plurality of convolutions comprise solid ribs.

3. The swivel coupling of claim 1, in which the plurality of convolutions comprise corrugations.

4. The swivel coupling of claim 1, in which the at least one convolution in the hose comprises a plurality of ribs axially spaced by a rib distance, each rib having an axial rib width, and a plurality of corrugations axially spaced by a corrugation distance, each corrugation having an axial corrugation width.

5. The swivel coupling of claim 4, in which the pair of inner engaging arms define an inner recess for receiving one of the plurality of ribs, the retainer clip further comprising a pair of intermediate engaging arms positioned on opposite sides of the inner engaging arms, each of the intermediate engaging arms being spaced from one of the inner engaging arms by the axial corrugation width to define a pair of intermediate recesses, each intermediate recess being sized to receive one of the plurality of corrugations.

6. The swivel coupling of claim 5, in which the pair of outer engaging arms are positioned on opposite sides of the intermediate engaging arms, each of the outer engaging arms being spaced from one of the intermediate engaging arms by the axial rib width to define a pair of outer recesses, each outer recess being sized to receive one of the plurality of ribs.

7. The swivel coupling of claim 1, in which the aperture comprises a rectangular shape, and in which the base portion of the clip has a matching rectangular shape.

8. The swivel coupling of claim 1, in which the hose comprises a flexible material, and in which the clip is fixed to an end of the hose.

9. The swivel coupling of claim 1, further comprising means for securing the retainer clip in the aperture.

10. The swivel coupling of claim 9, in which the means for securing the retainer clip in the aperture includes a locking tab extending axially from the retainer clip, the locking tab sized to extend outside a margin of the aperture so that, when the clip is inserted into the aperture, the locking tab prevents the retainer clip from exiting the aperture in a radial direction.

11. The swivel coupling of claim 9, in which the means for securing the retainer clip in the aperture comprises a sonic weld between the base portion of the retainer clip and the sleeve.

12. A vacuum hose assembly for attachment to a vacuum tank, the vacuum hose assembly comprising:

an accessory sleeve having a mounting portion adapted for attachment to a vacuum accessory and a seating portion, the seating portion defining a first aperture;

a hose extending along an axis and having a generally cylindrical outside surface, the hose having a first end sized for insertion into the seating portion of the accessory sleeve and a second end adapted for fluid communication with the vacuum tank, the first end being formed with at least a first convolution extending about the axis and a pair of troughs positioned at opposite axial sides of the first convolution, the first convolution having an axial width;

a first retainer clip having a base portion sized to closely fit inside the aperture, and a pair of engaging arms projecting from the base portion normal to the axis and axially spaced by a distance approximately equal to at least one axial convolution width;

wherein the retainer clip is removably insertable into the aperture so that the pair of engaging arms extend into the troughs on opposite axial sides of the first convolution to prevent the hose from moving in an axial direction, the engaging arms being aligned with the troughs to allow the hose to rotate relative to the retainer clip about the axis of the hose.

13. The vacuum hose assembly of claim 12, further comprising an attachment sleeve having a mounting portion adapted to fluidly communicate with an interior of the vacuum tank and a seating portion sized to receive the second end of the hose.

14. The vacuum hose assembly of claim 13, in which the attachment sleeve defines a second aperture, and in which the second end of the hose is formed with at least a second convolution extending about the axis and a pair of troughs positioned at opposite axial sides of the second convolution, the second convolution having a second axial width, the assembly further comprising a second retainer clip having a base portion sized to closely fit inside the second aperture, and a pair of engaging arms projecting from the base portion normal to the axis and axially spaced by a distance approximately equal to at least one second axial convolution width.

15. The vacuum hose assembly of claim 14, in which each of the first and second apertures comprises a rectangular shape.

16. The vacuum hose assembly of claim 14, in which the hose comprises a flexible material, and in which the first and second retainer clips are fixed to the first and second ends of the hose, respectively.

17. The vacuum hose assembly of claim 14, in which the first and second convolutions comprise solid ribs.

18. The vacuum hose assembly of claims 14, in which the first and second convolutions comprise corrugations.

19. The vacuum hose assembly of claim 12, further comprising means for securing the retainer clip in the aperture.

20. A method of removing a hose from a swivel coupling, the hose extending along an axis and having a generally cylindrical outside surface formed with at least one convolution extending about the axis, the convolution having an axial width, the swivel coupling including a sleeve with a seating portion sized to receive an end of the hose and defining an aperture, and a retainer clip having a base portion sized to closely fit the aperture, and at least two engaging arms projecting from the base portion and spaced to engage opposite sides of the convolution, the method comprising the steps of:

depressing the base portion of the retainer clip and attached hose in a radially inward direction until the base portion is disposed inside the seating portion of the sleeve; and pulling the hose and attached retainer clip out of the seating portion of the sleeve;

wherein the hose comprises a flexible material to allow sufficient deflection of the hose and retainer clip during the depressing step.

21. The method of claim 20, in which the retainer clip is permanently fixed to the hose.

\* \* \* \* \*